(12) United States Patent
Lu et al.

(10) Patent No.: US 11,436,146 B2
(45) Date of Patent: Sep. 6, 2022

(54) STORAGE CONTROL APPARATUS, PROCESSING APPARATUS, COMPUTER SYSTEM, AND STORAGE CONTROL METHOD

(71) Applicant: Alibaba Group Holding Limited, Grand Cayman (KY)

(72) Inventors: Yimin Lu, Hangzhou (CN); Xiaoyan Xiang, Shanghai (CN); Taotao Zhu, Hangzhou (CN); Chaojun Zhao, Hangzhou (CN)

(73) Assignee: Alibaba Group Holding Limited, Grand Caymen (KY)

( * ) Notice: Subject to any disclaimer, the term of this patent is extended or adjusted under 35 U.S.C. 154(b) by 0 days.

(21) Appl. No.: 16/938,723

(22) Filed: Jul. 24, 2020

(65) Prior Publication Data

US 2021/0089459 A1    Mar. 25, 2021

(30) Foreign Application Priority Data

Sep. 25, 2019 (CN) .......................... 201910913440.9

(51) Int. Cl.
*G06F 12/08* (2016.01)
*G06F 12/0871* (2016.01)
(Continued)

(52) U.S. Cl.
CPC ...... *G06F 12/0871* (2013.01); *G06F 12/0238* (2013.01); *G06F 12/0811* (2013.01); *G06F 12/0873* (2013.01); *G06F 12/1054* (2013.01)

(58) Field of Classification Search
CPC ............ G06F 12/0811; G06F 12/1054; G06F 12/0888; G06F 12/0873; G06F 12/0238;
(Continued)

(56) References Cited

U.S. PATENT DOCUMENTS 7,257,673 B2 * 8/2007 Emerson ............. G06F 12/0802
711/108
8,458,435 B1   6/2013 Rainey, III et al.
(Continued)

OTHER PUBLICATIONS

X. Jiang, Y. Solihin, L. Zhao and R. Iyer, "Architecture Support for Improving Bulk Memory Copying and Initialization Performance," 2009 18th International Conference on Parallel Architectures and Compilation Techniques, 2009, pp. 169-180.*
(Continued)

*Primary Examiner* — Pierre Michel Bataille

(57) ABSTRACT

A storage control apparatus, a storage control method, a processing apparatus, and a computer system are disclosed. The storage control apparatus includes: an address detection unit, adapted to detect whether any jump of physical addresses to which sequentially arriving write access requests are mapped occurs; and a logic control unit, adapted to use a no-write allocate policy if a cache is not hit and no jump of the physical addresses to which the plurality of sequentially arriving write access requests are mapped occurs, where in the no-write allocate policy, if a quantity of continuous jumps of the physical addresses to which the plurality of sequentially arriving write access requests are mapped is less than a preset quantity, the logic control unit keeps using the no-write allocate policy, where the preset quantity is greater than 1. When the quantity of continuous jumps of the physical addresses to which the sequentially arriving write access requests are mapped is less than the preset quantity, embodiments of the present disclosure can keep using the no-write allocate policy, and avoid selecting a write allocate policy during processing of information of a low access probability. Therefore, robustness and stability of the computer system are enhanced.

31 Claims, 7 Drawing Sheets

(51) Int. Cl.
*G06F 12/0873* (2016.01)
*G06F 12/02* (2006.01)
*G06F 12/1045* (2016.01)
*G06F 12/0811* (2016.01)

(58) Field of Classification Search
CPC ......... G06F 12/0871; G06F 2212/1016; G06F 2212/502
See application file for complete search history.

(56) References Cited

U.S. PATENT DOCUMENTS

| | | | |
|---|---|---|---|
| 9,223,710 B2* | 12/2015 | Alameldeen | G06F 12/0864 |
| 9,836,403 B2* | 12/2017 | Johar | G06F 12/0871 |
| 2005/0108472 A1 | 5/2005 | Kanai et al. | |
| 2007/0186057 A1 | 8/2007 | Moll et al. | |
| 2010/0259785 A1 | 10/2010 | Mori | |
| 2011/0138100 A1 | 6/2011 | Sinclair | |
| 2013/0151779 A1* | 6/2013 | Daly | G06F 12/122 |
| | | | 711/E12.024 |
| 2015/0356019 A1* | 12/2015 | Johar | G06F 12/0831 |
| | | | 711/142 |
| 2017/0255569 A1* | 9/2017 | Sartorius | G06F 12/1027 |
| 2018/0150935 A1* | 5/2018 | Tang | G06T 5/002 |
| 2018/0165221 A1* | 6/2018 | Fowler | G06F 12/126 |

OTHER PUBLICATIONS

Lipp et al., "Meltdown: Reading Kernel Memory from User Space". In: 27th (USENIX) Security Symposium. Aug. 17, 2018 (Aug. 17, 2018) Retrieved on Sep. 23, 2020 (Sep. 23, 2020) from https://www.usenix.org/system/files/conference/usenixsecurity18/ sec-18-lipp.pdf> entire document.

* cited by examiner

STORAGE CONTROL APPARATUS, PROCESSING APPARATUS, COMPUTER SYSTEM, AND STORAGE CONTROL METHOD

CROSS-REFERENCE TO RELATED APPLICATIONS

This application claims priority to Chinese Patent Application No. 201910913440.9 filed Sep. 25, 2019, which is incorporated herein in its entirety.

TECHNICAL FIELD

The present invention relates to the processor field, and more specifically, to a storage control apparatus, a processing apparatus, a computer system, and a storage control method.

BACKGROUND OF THE INVENTION

To reduce a speed difference between a processor and a memory, a cache (Cache) is generally disposed between the processor and the memory. An access speed of the cache is higher than that of the memory. The cache is configured to temporarily store some data information and/or instruction information such as program data or packet data that may be repeatedly invoked in the memory. The memory herein is generally a main memory (or primary memory, system memory or memory for short). The memory is configured to store instruction information and/or data information that are/is indicated by a data signal, for example, store data provided by the processor and/or implement information exchange between the processor and an external storage device.

The processor may access the main memory by initiating a write access request, where the write access request specifies an address to which data needs to be written and the data that needs to be written. After the processor initiates the write access request, if a data block that needs to be accessed is already temporarily stored in the cache, which is referred to as a cache hit, the processor may directly access the cache without accessing the memory, thereby avoiding a long latency caused by memory access; or if a data block that needs to be accessed is not temporarily stored in the cache, which is referred to as a cache miss, the processor may use a write allocate policy or a no-write allocate policy to process the write access request.

Write allocate (WriteAllocate) policy: When a cache miss occurs, first, a read request is initiated to a lower-level memory of the cache, to invoke a data block that is in the memory and matches the write access request into the cache; and then the corresponding data block in the cache is updated based on data specified by the write access request.

No write allocate (Write-No-Allocate) policy: When a cache miss occurs, a write request is directly initiated to the memory, to update a corresponding data block in the memory based on the data specified by the write access request, without modifying the cache.

In comparison with the write allocate policy, the no-write allocate policy takes a shorter time, and is more suitable for processing data that will not be accessed again within a short time. In the write allocate policy, the data specified by the write access request may be stored in the cache. Therefore, in comparison with the no-write allocate policy, the write allocate policy is more suitable for processing data that may be repeatedly accessed.

In a conventional solution, if it is detected that continuous write access requests are mapped to continuous physical addresses (that is, no jump occurs), the no-write allocate policy is used to respond to the write access requests. If it is detected that any jump of physical addresses to which continuous write access requests are mapped occurs, the processor directly quits a no-write allocate operation, and switches to a write allocate operation.

However, for continuous write access requests, some data that may not be repeatedly accessed may not necessarily correspond to continuous physical addresses. For example, in a memory copy operation process or the like, the processor may need to jump to other addresses at regular intervals to perform memory move operations or the like; in some processes, data blocks that need to be continuously accessed may have continuous virtual addresses and discontinuous physical addresses. In the conventional solution, a write allocate operation may be used in such cases of physical address jumps. Therefore, efficiency of the processor is reduced, and performance of the processor is reduced.

SUMMARY OF THE INVENTION

In view of this, embodiments of the present invention provide a storage control apparatus, a processing apparatus, a computer system, and a storage control method that have higher robustness, to resolve the foregoing problem.

To achieve this objective, according to a first aspect, the present invention provides a storage control apparatus, including: an address detection unit, adapted to detect whether any jump of physical addresses to which sequentially arriving write access requests are mapped occurs; and a logic control unit, coupled to the address detection unit, and adapted to use a no-write allocate policy to process the write access requests if a cache is not hit and no jump of the physical addresses to which the plurality of sequentially arriving write access requests are mapped occurs, where in the no-write allocate policy, if a quantity of continuous jumps of the physical addresses to which the plurality of sequentially arriving write access requests are mapped is less than a preset quantity, the logic control unit keeps using the no-write allocate policy, where the preset quantity is greater than 1.

In some embodiments, the write access request includes: a physical address to which a storage instruction is mapped; and written data specified by the storage instruction, where in the no-write allocate policy, the written data is written to a memory and is not written to the cache.

In some embodiments, the logic control unit is adapted to: in the no-write allocate policy, if the quantity of continuous jumps of the physical addresses to which the plurality of sequentially arriving write access requests are mapped is greater than or equal to the preset quantity, use, by the logic control unit, a write allocate policy, where in the write allocate policy, the written data is written to the cache.

In some embodiments, the logic control unit is adapted to: in an initial state, select to use the write allocate policy, and if no jump of the physical addresses to which the sequentially arriving write access requests are mapped occurs, exit, by the logic control unit, the initial state, and enter a primary screening state; and in the primary screening state, use the no-write allocate policy, and if the quantity of continuous jumps of the physical addresses to which the plurality of sequentially arriving write access requests are mapped is equal to the preset quantity, return to the initial state.

In some embodiments, the logic control unit is further adapted to: in the primary screening state, if no jump of the physical addresses to which the sequentially arriving write access requests are mapped occurs, enter a level 1 caching state; and in the level 1 caching state, if any jump of the physical addresses to which the sequentially arriving write access requests are mapped occurs, return to the primary screening state.

In some embodiments, the logic control unit is further adapted to: in the level 1 caching state to a level K−1 caching state, if no jump of the physical addresses to which the plurality of sequentially arriving write access requests are mapped occurs, transition to a lower-level caching state; and in a level 2 caching state to a level K caching state, if any jump of the physical addresses to which the sequentially arriving write access requests are mapped occurs, transition to an upper-level caching state, where K is a natural number greater than or equal to 2.

In some embodiments, the storage control apparatus further includes a register configured to store a cache depth value, where the logic control unit is further adapted to: in an initial phase, use the write allocate policy, and reset the cache depth value to an initial value; if the sequentially arriving write access requests are sequentially mapped to continuous physical addresses, increase the cache depth value based on a first preset gradient; if any jump of the physical addresses to which the sequentially arriving write access requests are mapped occurs, decrease the cache depth value based on a second preset gradient; and if any jump of the physical addresses to which the sequentially arriving write access requests are mapped occurs, decrease the cache depth value based on a second preset gradient; and when the cache depth value is less than a specified threshold, select to use the write allocate policy, or when the cache depth value is greater than or equal to the specified threshold, select to use the no-write allocate policy.

In some embodiments, the specified threshold is greater than or equal to a sum of the initial value and the first preset gradient.

In some embodiments, the write access request further includes write policy information, where the write policy information indicates one of the write allocate policy and the no-write allocate policy; and the logic control unit is configured to perform the following: screening the write policy information of the write access request, to select to use the no-write allocate policy; or using the write allocate policy based on the write policy information of the write access request.

In some embodiments, the storage control apparatus further includes: a read cache unit, adapted to initiate a read request to the memory in the write allocate policy, and store a data block returned by the memory in the cache, so that the data block is modified based on the written data.

In some embodiments, the storage control apparatus further includes: a write cache unit, adapted to initiate a write request to the memory in the no-write allocate policy, so that a corresponding data block in the memory is modified based on the written data.

In some embodiments, the preset quantity is set to a fixed value, or is determined based on a quantity of times that a memory access function is invoked, where the memory access function is implemented by at least one of the write access requests.

According to a second aspect, an embodiment of the present disclosure provides a processing apparatus, where the processing apparatus is a processor, a processor core, or a system on chip, and includes any one of the foregoing storage control apparatuses.

In some embodiments, the processing apparatus further includes an instruction execution unit, adapted to provide the write access request based on the storage instruction; and a hardware register, adapted to provide the write policy information.

In some embodiments, the processing apparatus further includes a memory management unit, coupled to the register, and adapted to provide an entry that matches a virtual address specified by the storage instruction, to translate the virtual address based on the entry into the physical address to which the storage instruction is mapped and provide the write policy information to the instruction execution unit.

In some embodiments, the hardware register is a global register.

According to a third aspect, an embodiment of the present disclosure further provides a storage control method, including: detecting whether any jump of physical addresses to which sequentially arriving write access requests are mapped occurs; and using a no-write allocate policy to process the write access requests if a cache is not hit and no jump of the physical addresses to which the plurality of sequentially arriving write access requests are mapped occurs, where in the no-write allocate policy, if a quantity of continuous jumps of the physical addresses to which the plurality of sequentially arriving write access requests are mapped is less than a preset quantity, keeping using the no-write allocate policy, where the preset quantity is greater than 1.

In some embodiments, the write access request includes: a physical address to which a storage instruction is mapped; and written data specified by the storage instruction, where in the no-write allocate policy, the written data is written to a memory and is not written to the cache.

In some embodiments, the storage control method further includes: in the no-write allocate policy, if the quantity of continuous jumps of the physical addresses to which the plurality of sequentially arriving write access requests are mapped is greater than or equal to the preset quantity, using, by the logic control unit, a write allocate policy, where in the write allocate policy, the written data is written to the cache.

In some embodiments, the storage control logic includes: in an initial state, selecting to use the write allocate policy, and if no jump of the physical addresses to which the plurality of sequentially arriving write access requests are mapped occurs, exiting, by the logic control unit, the initial state, and entering a primary screening state; and in the primary screening state, using the no-write allocate policy, and if the quantity of continuous jumps of the physical addresses to which the plurality of sequentially arriving write access requests are mapped is equal to the preset quantity, returning to the initial state.

In some embodiments, the storage control logic further includes: in the primary screening state, if no jump of the physical addresses to which the plurality of sequentially arriving write access requests are mapped occurs, entering a level 1 caching state; and in the level 1 caching state, if any jump of the physical addresses to which the sequentially arriving write access requests are mapped occurs, returning to the primary screening state.

In some embodiments, the storage control logic further includes: in the level 1 caching state to a level K−1 caching state, if no jump of the physical addresses to which the plurality of sequentially arriving write access requests are mapped occurs, transitioning to a lower-level caching state; and in a level 2 caching state to a level K caching state, if any jump of the physical addresses to which the sequentially arriving write access requests are mapped occurs, transitioning to an upper-level caching state, where K is a natural number greater than or equal to 2.

In some embodiments, the storage control logic includes: in an initial phase, using the write allocate policy, and resetting the cache depth value to an initial value; if no jump of the physical addresses to which the sequentially arriving write access requests are mapped occurs, increasing the cache depth value based on a first preset gradient; if any jump of the physical addresses to which the sequentially arriving write access requests are mapped occurs, decreasing the cache depth value based on a second preset gradient; and when the cache depth value is less than a specified threshold, selecting to use the write allocate policy, or when the cache depth value is greater than or equal to the specified threshold, selecting to use the no-write allocate policy.

In some embodiments, the specified threshold is greater than or equal to a sum of the initial value and the first preset gradient.

In some embodiments, the write access request further includes write policy information, where the write policy information indicates one of the write allocate policy and the no-write allocate policy; and by screening the write policy information of the write access request, the storage control logic selects to use the no-write allocate policy, or use the write allocate policy based on the write policy information of the write access request.

In some embodiments, the storage control method further includes: obtaining an entry that matches a virtual address specified by the storage instruction; translating, based on an identifier of the entry and the data, the virtual address specified by the storage instruction into the physical address to which the storage instruction is mapped; and providing the write policy information based on an attribute flag of the entry.

In some embodiments, the write policy information is provided by a global register.

In some embodiments, the storage control logic further includes: initiating a read request to the memory in the write allocate policy, and storing a data block returned by the memory in the cache, so that the data block is modified based on the written data.

In some embodiments, the storage control logic further includes: initiating a read request to the memory in the no-write allocate policy, so that a corresponding data block in the memory is modified based on the written data.

In some embodiments, the preset quantity is set to a fixed value, or is determined based on a quantity of times that a memory access function is invoked, where the memory access function is implemented by at least one of the write access requests.

According to a fourth aspect, an embodiment of the present disclosure further provides a computer system, including: any one of the foregoing processing apparatus; a cache, coupled to the storage control apparatus; and a memory, coupled to the storage control apparatus.

In some embodiments, the computer system is implemented by a system-on-a-chip.

In comparison with a conventional solution, the storage control method, storage control apparatus, processing apparatus, and computer system provided by the embodiments of the present disclosure can detect whether a plurality of jumps of the physical addresses to which the sequentially arriving write access requests are mapped occur, and if a quantity of continuous jumps of the physical addresses to which the plurality of sequentially arriving write access requests are mapped is less than the preset quantity, keep using the no-write allocate policy, instead of storing the written data specified by the write access requests in the cache and/or the memory, to avoid, as much as possible, completing storage of the written data by selecting the write allocate policy during processing of information of a low access probability, avoid storing written data of a low access probability in the cache, improve performance and efficiency of the computer system, and enhance robustness and stability of the processor and the computer system.

BRIEF DESCRIPTION OF THE DRAWINGS

The above and other objectives, features, and advantages of the present invention will become more apparent by describing the embodiments of the present invention with reference to the following accompanying drawings. In the drawing.

DETAILED DESCRIPTION OF THE INVENTION

Figure 1:
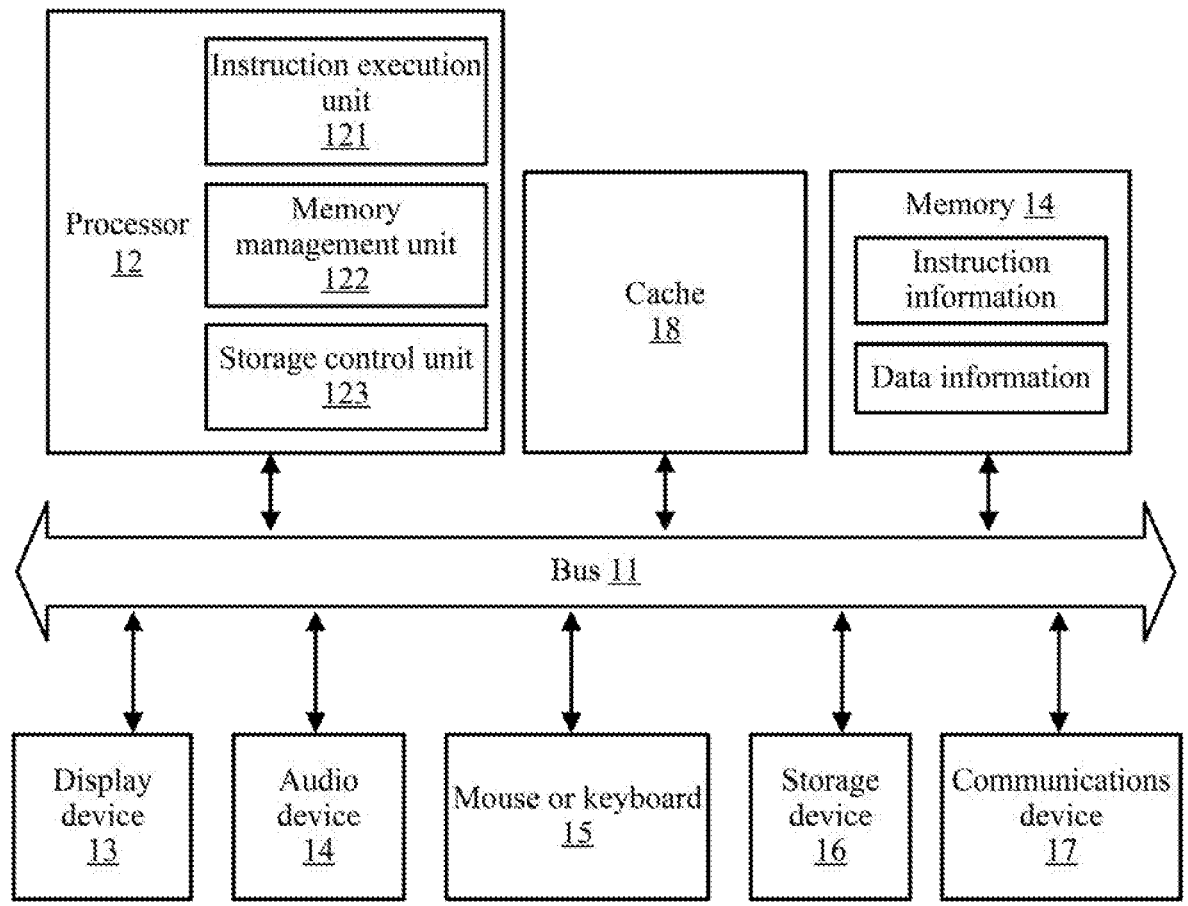
FIG. 1 illustrates a schematic block diagram of a computer system according to an embodiment of the present invention.

The following describes the present invention based on embodiments. The present invention, however, is not limited to these embodiments. The following description of the present invention gives some specific details. Without the description of such details, the present invention can still be fully understood by those skilled in the art. To avoid confusing the essence of the present invention, well-known methods, processes and procedures are not described in detail. In addition, the accompanying drawings are not necessarily drawn to scale.

The following terms are used in this specification.

Computer system: It is a general embedded system, a desktop computer, a server, a system on chip, or another system having an information processing capability.

Memory: It is a physical structure located within the computer system and used for storing information. By purpose, memories can be categorized into a main memory (also referred to an internal memory, or simply referred to as a memory/main memory) and a secondary memory (also referred to as an external memory, or simply referred to as a secondary memory/external memory). The main memory is used for storing instruction information and/or data information represented by data signals, for example, used for storing data provided by a processor, or may be used for information exchange between the processor and the external memory. Information provided by the external memory needs to be transferred to the main memory before being accessible by the processor. Therefore, a memory mentioned herein is generally a main memory, and a storage device mentioned herein is generally an external memory.

Physical address (Physical Address, PA for short): It is an address on an address bus. The processor or other hardware may provide a physical address to the address bus to access the main memory. The physical address may also be referred to as an actual address, a real address, or an absolute address. "Continuous physical addresses" in this specification may correspond to binary codes whose numeric values are continuous. However, the embodiments of the present disclosure are not limited thereto. In some specific designs, alternatively, "continuous physical addresses" may correspond to binary codes in which only one bit is different.

Virtual address: It is an abstract address used by software or a program. A virtual address space may be larger than a physical address space, and a virtual address may be mapped to a corresponding physical address.

Paging management mechanism: The virtual address space is divided into a plurality of parts, where each part is used as a virtual page (page). In addition, the physical address space is divided into a plurality of parts, where each part is used as a physical page (pageframe). The physical page is also referred to as a physical block or a physical pageframe.

Page table: It is used to specify a correspondence between a virtual page and a physical page, and generally stored in the main memory. The page table includes a plurality of entries, where each entry is used to specify a mapping relationship between a virtual page and a physical page and some management flags, so that a virtual address in a virtual page can be translated into a physical address in a corresponding physical page. Some entries included in the page table may be temporarily stored in a register outside the main memory, so that the entries are invoked in an address translation process.

Write allocate policy: When a cache miss occurs, first, a read request is initiated to a lower-level memory of a cache, to invoke a data block that is in the memory and matches a write access request into the cache; and then the corresponding data block in the cache is updated based on data specified by the write access request. A write allocate operation may also be referred to as a FetchOnWrite (FetchOnWrite) operation.

Non write allocate policy: When a cache miss occurs, a write request is directly initiated to the memory, to update a corresponding data block in the memory based on the data specified by the write access request, without modifying the cache.

Cache hit and miss: When the processor needs to access information in the main memory, first, the cache may be searched for the required information. If the cache already stores the required information, which is referred to as a cache hit or a hit, no search needs to be performed on the main memory. If the cache does not store the required information, it is referred to as a cache miss, or may be referred to as a miss, or a failure.

Memory access function: It is a function that needs to access the memory. For example, it is a memory copy function or a memory initialization function.

Memory copy operation: It is an operation implemented by a memory copy function (memcpy) in languages C and C++, and is used to copy several pieces of data (each piece of data is, for example, one byte in length) from a source main memory address to a destination main memory address. Each memory copy operation may be implemented by invoking the memory copy function at least once.

Memory initialization operation: It is an operation implemented by using a memory initialization function (memset) in the languages C and C++, and is used to set all specified content of the main memory to specified values. Each memory initialization operation may be implemented by invoking the memory initialization function at least once.

Operations such as memory copy or memory initialization generally need to write a series of information (instruction information and/or data information) to the main memory. The information is massive, but is not accessed frequently. Therefore, it is expected that the information should not be written to the cache, to save time and avoid occupancy of the cache by information of a low access probability.

When performing an operation such as memory copy or memory initialization that needs to update the main memory, the processor sequentially initiates a plurality of write access requests to modify corresponding information in the main memory. Each write access request specifies a physical address that needs to be accessed and data that needs to be written, and may further specify some auxiliary information, where the auxiliary information may include write allocate information used to indicate whether the write allocate policy is valid. "Continuous write access requests" or "sequentially arriving write access requests" mentioned in this specification are write access requests that are initiated continuously in sequence. This series of write access requests will be processed sequentially.

However, in some cases, sequentially arriving write access requests are mapped to discontinuous physical addresses. For example, when a memory copy operation is being performed, jumps of physical addresses that the processor needs to access may occur at intervals, that is, jumps of physical addresses specified by a series of write access requests initiated by the processor may occur. For another example, program-oriented virtual pages are continuous, but the continuous virtual pages may be mapped to discontinuous physical pages; consequentially, continuous virtual addresses are mapped to discontinuous physical addresses.

In a conventional solution, if it is detected that continuous write access requests are mapped to continuous physical addresses (that is, no jump occurs), the no-write allocate policy is used to respond to the write access requests, if it is detected that any jump of physical addresses to which continuous write access requests are mapped occurs, the processor directly quits the no-write allocate policy, and switches to the write allocate policy. Based on the foregoing analysis, in a memory copy operation process or the like, a case in which continuously arriving write access requests are mapped to discontinuous physical addresses (that is, a physical address jump occurs) may occur. Therefore, in the conventional solution, unnecessary switching between the write allocate policy and the no-write allocate policy occurs for a plurality of times during a memory copy operation or the like. Therefore, performance and efficiency of the processor are reduced.

Based on this, an embodiment of this application provides a storage control solution. The storage control solution is used to dynamically make a selection and perform switching between a write allocate policy and a no-write allocate policy based on physical addresses to which sequentially arriving write access requests are mapped, and when a quantity of continuous jumps of physical addresses to which the plurality of sequentially arriving write access requests are mapped is less than a preset quantity, can still keep using the no-write allocate policy, instead of storing written data specified by the write access requests in a cache and/or a memory, thereby capable of restoration from the no-write allocate policy to the write allocate policy only when the quantity of continuous jumps of the physical addresses to which the plurality of sequentially arriving write access requests are mapped is greater than or equal to the preset quantity. Therefore, processing of the write access requests is optimized, and robustness and efficiency of a processor are improved.

The following describes the embodiments of the present invention exemplarily by using an application scenario of a memory copy operation, but the embodiments of the present invention are not limited thereto. Based on enlightenments of the embodiments of the present invention, this application may be further applied to other operations, for example, a memory initialization operation implemented by a memory initialization function or the like or by an instruction, or another related operation that may be oriented to discontinuous physical addresses and oriented to information of a low access probability.

System Overview

FIG. 1 illustrates a schematic block diagram of a computer system according to an embodiment of the present invention. The computer system 10 is an example of a "central" system architecture. The computer system 10 may be constructed based on processors of various models in a current market, and driven by an operating system such as a WINDOWS™ operating system, a UNIX operating system, or a Linux operating system. In addition, the computer system 10 may be implemented in hardware and/or software such as a PC computer, a desktop computer, laptop computer, a notebook, tablet, a server, smart phone and a mobile communications apparatus.

As shown in FIG. 1, the computer system 10 in this embodiment of the present invention may include one or more processors 12 and a memory 14. The memory 14 in the computer system 10 may be a main memory (which may also be referred to as system memory, primary memory or memory). The memory is configured to store instruction information and/or data information, for example, provided by the processor 12, or may be configured to implement data exchange between the processor 12 and an external storage device 16 (which may also be referred to as backing store, store, secondary memory or external memory).

In some cases, the processor 12 may need to access the memory 14 to obtain data in the memory 14 or modify data in the memory 14. Because an access speed of the memory 14 is low, to reduce a speed difference between the processor 12 and the memory 14, the computer system 10 further includes a cache 18 coupled to a bus 11, where the cache 18 is configured to temporarily store instructions and/or data such as program data or packet data that may be repeatedly invoked in the memory 14. The cache 18 is implemented by a type of storage apparatus, for example, a static random access memory (SRAM). The cache 18 may be a multi-level structure, for example, a three-level cache structure having a level 1 cache (L1 Cache), a level 2 cache (L2 Cache), and a level 3 cache (L3 Cache), or may be a cache structure of more than three levels or another type of cache structure. In some embodiments, a part of the cache 18 (for example, the level 1 cache, or the level 1 cache and the level 2 cache) may be integrated in the processor 12, or integrated with the processor 12 in a system-on-a-chip (SOC).

Based on this, the processor 12 may include parts such as an instruction execution unit 121, a memory management unit 122, and a storage control unit 123. When executing some instructions that need to modify the memory, the instruction execution unit 121 initiates a write access request, where the write access request specifies written data that needs to be written to the memory and a corresponding address. The memory management unit 122 is configured to translate a virtual address specified by the instructions into a physical address to which the virtual address is mapped. The storage control unit 123 is configured to perform a write allocate operation (which may also be referred to as a fetch on write operation) or a no-write allocate operation (which may also be referred to as a non-write allocate operation, write-no-allocate operation or write around operation) to store the written data in a storage location pointed to by the physical address to which the write access request is mapped.

Information exchange between the memory 14 and the cache 18 is generally organized based on blocks. In some embodiments, the cache 18 and the memory 14 may be divided into data blocks based on a same space dimension. A data block may be used as a smallest unit (including one or more pieces of data of a preset length) between the cache 18 and the memory 14. For brief and clear expression, each data block in the cache 18 is hereinafter referred to as a cache block for short (which may also be referred to as a cacheline or a cache line), and different cache blocks have different cache block addresses; each data block in the memory 14 is referred to as a memory block for short, and different memory blocks have different memory block addresses. A cache block address includes, for example, a physical address label used to locate a data block of the corresponding cache block.

Due to a space limitation and a resource limitation, the cache 18 cannot temporarily store all content in the memory 14. To be specific, a storage capacity of the cache 18 is generally smaller than that of the memory 14, and cache block addresses provided by the cache 18 cannot correspond to all memory block addresses provided by the memory 14. When the processor 12 needs to access the memory, the processor 12 first accesses the cache 18 by using the bus 11, to determine whether content to be accessed is already stored in the cache 18. When the content to be accessed is in the cache 18 the access is referred to as a cache hit, and the processor 12 directly invokes the content to be accessed from the cache 18. When the content to be accessed by the processor 12 is not in the cache 18, the access is referred to as a cache miss, and the processor 12 needs to access the memory 14 by using the bus 11, to find corresponding information in the memory 14. Because an access speed of the cache 18 is very high, when the cache 18 is hit, efficiency of the processor 12 can be improved significantly, and further, performance and efficiency of the entire computer system 10 are also improved.

In addition, the computer system 10 may further include a storage device 16, a display device 13, an audio device 14, and an input/output device such as a mouse or keyboard 15. The storage device 16 is, for example, a device used for information access, such as a hard disk coupled to the bus 11 by using a corresponding interface, an optical disc, and a flash memory. The display device 13 is, for example, coupled to the bus 11 by using a corresponding video card, and configured to perform displaying based on a display signal provided by the bus 11.

The computer system 10 generally further includes a communications device 17, and therefore can communicate with a network or another device by various means. The communications device 17 may include, for example, one or more communications modules. For example, the communications device 17 may include a wireless communications module applicable to a specific wireless communications protocol. For example, the communications device 17 may include a WLAN module, configured to implement Wi-Fi communication in compliance with the 802.11 standard defined by the Institute of Electrical and Electronics Engineers (IEE). The communications device 17 may also include a WWAN module, configured to implement wireless wide area network communication in compliance with the cellular protocol or other wireless wide area network protocols. The communications device 17 may further include a communications module using any other protocol, for example, a Bluetooth module, or another customized communications module. The communications device 17 may also be a port used for serial transmission of data.

Certainly, structures of different computer systems may also vary depending on different mother boards, operating systems, and instruction set architectures. For example, currently, many computer systems are equipped with an input/output control center connected between the bus 11 and each input/output device, and the input/output control center may be integrated in the processor 12 or is independent of the processor 12.

As described hereinafter, the storage control unit 123 in the computer system 10 in this embodiment of the present disclosure detects whether a plurality of jumps of physical addresses to which sequentially arriving write access requests are mapped occur, and selects one of a write allocate operation and a no-write allocate operation to store written data specified by the write access requests in the cache 18 and/or the memory 14, to avoid, as much as possible, completing storage of the written data by selecting the write allocate operation during processing of information of a low access probability, avoid storing written data of a low access probability in the cache, and improve performance and efficiency of the computer system.

Processor

Figure 2:
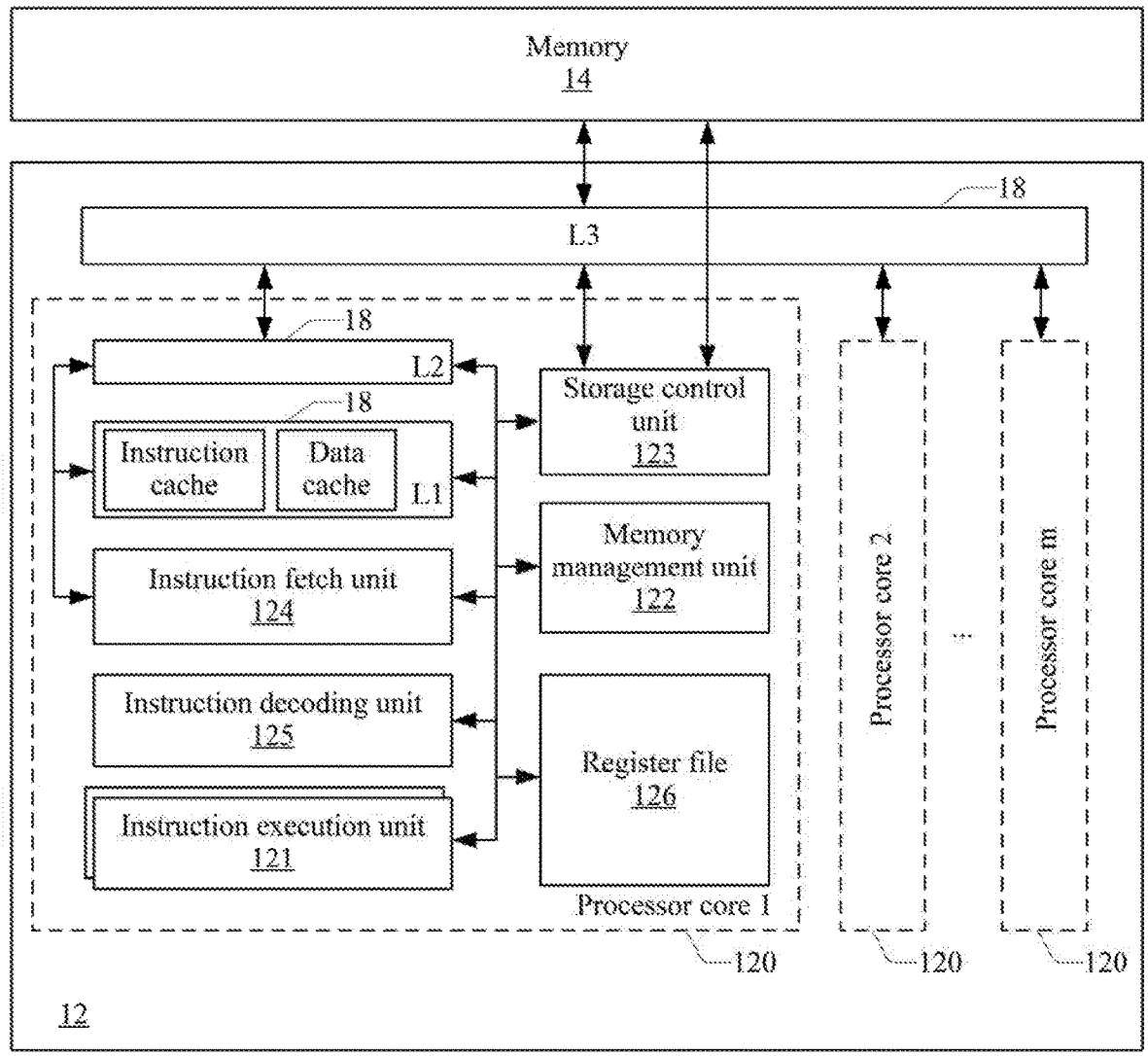
FIG. 2 is a schematic block diagram of a processor according to an embodiment of the present invention.

FIG. 2 is a schematic block diagram of the processor 12 according to an embodiment of the present invention. In some embodiments, each processor 12 may include one or more processor cores 120 configured to process instructions. Processing and execution of the instructions may be controlled by a user (for example, by using an application program) and/or a system platform. In some embodiments, each processor core 120 may be configured to process a specific instruction set. In some embodiments, the instruction set may support complex instruction set computing (CISC), reduced instruction set computing (RISC), or very long instruction word (VLIW)-based computing. Different processor cores 120 may process different instruction sets or a same instruction set. In some embodiments, the processor core 120 may further include other processing modules, for example, a digital signal processor (DSP). As an example, FIG. 2 illustrates processor cores 1 to m, where m is a non-zero natural number.

In some embodiments, the cache 18 shown in FIG. 1 may be completely or partly integrated in the processor 12. In addition, based on different architectures, the cache 18 may be a single internal cache or multi-level caches located in and/or outside each processor core 120 (for example, three-level caches L1 to L3 shown in FIG. 2, all of which are identified as 18 in FIG. 2), or may include an instruction cache and a data cache. In some embodiments, each component of the processor 12 may share at least one part of the cache. For example, as shown in FIG. 2, the processor cores 1 to m share the level 3 cache L3. The processor 12 may further include an external cache (not illustrated). Alternatively, another cache structure may be used as an external cache of the processor 12.

In some embodiments, as shown in FIG. 2, the processor 12 may include a register file 126 (RegisterFile). The register file 126 may include a plurality of registers configured to store different types of data and/or instructions, and the registers may be of different types. For example, the register file 126 may include an integer register, a floating-point register, a status register, an instruction register, and a pointer register. The registers in the register file 126 may be implemented by using general registers, or may be particularly designed based on an actual requirement of the processor 12.

The processor 12 may include the memory management unit (MMU) 122, configured to translate a virtual address into a physical address. Some entries in a page table are temporarily stored in the memory management unit 122. The memory management unit 122 may also obtain, from the memory, entries that are not temporarily stored. One or more memory management units 122 may be disposed in each processor core 120. Memory management units 122 in different processor cores 120 may also implement synchronization with memory management units 120 located in other processors or processor cores, so that each processor or processor core can share a unified virtual storage system.

The processor 12 is configured to execute an instruction sequence (that is, a program). A process of executing each instruction by the processor 12 includes steps of fetching an instruction from the memory that stores the instruction, decoding the fetched instruction, executing the decoded instruction, saving an instruction execution result, and the like. This cycle is repeated until all instructions in an instruction set are executed or a shutdown instruction is encountered.

To implement the foregoing process, the processor 12 may include an instruction fetch unit 124, an instruction decoding unit 125, an instruction transmission unit (not shown), an instruction execution unit 121, an instruction retirement unit (not shown), and the like.

The instruction fetch unit 124, as a start engine of the processor 12, is configured to move an instruction from the memory 14 to an instruction register (which may be a register for storing an instruction, in the register file 26 shown in FIG. 2), and receive a next instruction fetch address or obtain a next instruction fetch address through a calculation based on an instruction fetch algorithm, where the instruction fetch algorithm includes, for example, increasing or decreasing addresses based on a length of an instruction.

After fetching an instruction, the processor 12 enters an instruction decoding phase. The instruction decoding unit 125 decodes the fetched instruction based on a predetermined instruction format, to obtain operand obtaining information required by the fetched instruction, to prepare for an operation of the instruction execution unit 121. The operand obtaining information points to, for example, an immediate, a register, or other software or hardware that can provide a source operand.

The instruction transmission unit generally exists in the high-performance processor 12, and is located between the instruction decoding unit 125 and the instruction execution unit, and configured to schedule and control an instruction, to allocate each instruction to different instruction execution units 121 efficiently, so that parallel operations of a plurality of instructions become possible. After the instruction is fetched, decoded, and scheduled to a corresponding instruction execution unit 121, the corresponding instruction execution unit 121 starts to execute the instruction, that is, perform an operation indicated by the instruction, and implement a corresponding function.

The instruction retirement unit (or referred to as an instruction write-back unit) is mainly responsible for writing back an execution result generated by the instruction execution unit 121 to a corresponding storage location (for example, an internal register of the processor 12), so that the corresponding execution result can be quickly obtained from the storage location by using a subsequent instruction.

For instructions of different types, different instruction execution units 121 may be correspondingly disposed in the processor 12. The instruction execution unit 121 may be an operation unit (for example, include an arithmetic logic unit or a vector operation unit, and configured to perform an operation based on an operand and output an operation result), a memory execution unit (for example, configured to access the memory based on an instruction to read data in the memory or write specified data to the memory), a coprocessor, or the like. In the processor 12, each instruction execution unit 121 may run in parallel and output a corresponding execution result.

When executing a type of instruction (for example, a memory access instruction), the instruction execution unit 121 needs to access the memory 14, to obtain information stored in the memory 14 or provide data that needs to be written to the memory 14.

It should be noted that, the instruction execution unit 121 configured to execute the memory access instruction may also be referred to as a memory execution unit for short. The memory execution unit is, for example, a load store unit (LSU) and/or another unit used for memory access.

After the memory access instruction is obtained by the instruction fetch unit 124, the instruction decoding unit 125 may decode the memory access instruction, so that a source operand of the memory access instruction can be obtained. The decoded memory access instruction is provided to the corresponding instruction execution unit 121, and the instruction execution unit 121 may perform a corresponding operation (for example, the arithmetic logic unit performs an operation on the source operand stored in the register) on the source operand of the memory access instruction to obtain address information corresponding to the memory access instruction, and initiate a corresponding request based on the address information, for example, an address translation request, or a write access request.

The source operand of the memory access instruction generally includes an address operand. The instruction execution unit 121 performs an operation on the address operand to obtain a virtual address or physical address corresponding to the memory access instruction. When the memory management unit 122 is disabled, the instruction execution unit 121 may obtain the physical address of the memory access instruction directly through a logic operation. When the memory management unit 122 is enabled, the corresponding instruction execution unit 121 initiates an address translation request based on the virtual address corresponding to the memory access instruction, where the address translation request includes the virtual address corresponding to the address operand of the memory access instruction; and the memory management unit 122 responds to the address translation request, and translates the virtual address in the address translation request into the physical address based on an entry that matches the virtual address, so that the instruction execution unit 121 can access the cache 18 and/or the memory 14 based on the translated physical address.

The memory access instruction may include a load instruction and a storage instruction based on different functions. In a process of executing the load instruction, information in the memory 14 or the cache 18 generally does not need to be modified, and the instruction execution unit 121 only needs to read, based on an address operand of the load instruction, data stored in the memory 14, the cache 18, or an external storage device.

Different from that of the load instruction, a source operand of the storage instruction includes not only an address operand, but also data information. In a process of executing the storage instruction, the memory 14 and/or the cache 18 generally need/needs to be modified. The data information of the storage instruction may point to written data, where a source of the written data may be an execution result of an operation instruction, a load instruction, or the like, or may be data provided by a register in the processor 12 or another storage unit, or may be an immediate.

A memory copy operation is generally used to copy several bytes stored in a source storage area of the memory 14 to a destination storage area of the memory 14. A function format of a memory copy function (memcpy) is, for example, memcpy(destin, source, n)

where destin points to a destination storage area (a storage area of the memory 14) that needs to store replicated content, source points to a source storage area (a storage area of the memory 14) where the replicated content is located, and n indicates a quantity of bytes included in the replicated content.

The memory copy function may be implemented by a series of memory access instructions. The processor 12 may obtain the n-byte replicated content stored in the source storage area, and execute a storage instruction stream, to write the replicated content to the destination storage area. The replicated content may be divided into a plurality of pieces of written data based on bytes or words or other units, and each storage instruction is used to write a corresponding piece of written data to a corresponding storage location in the destination storage area.

Figure 3:
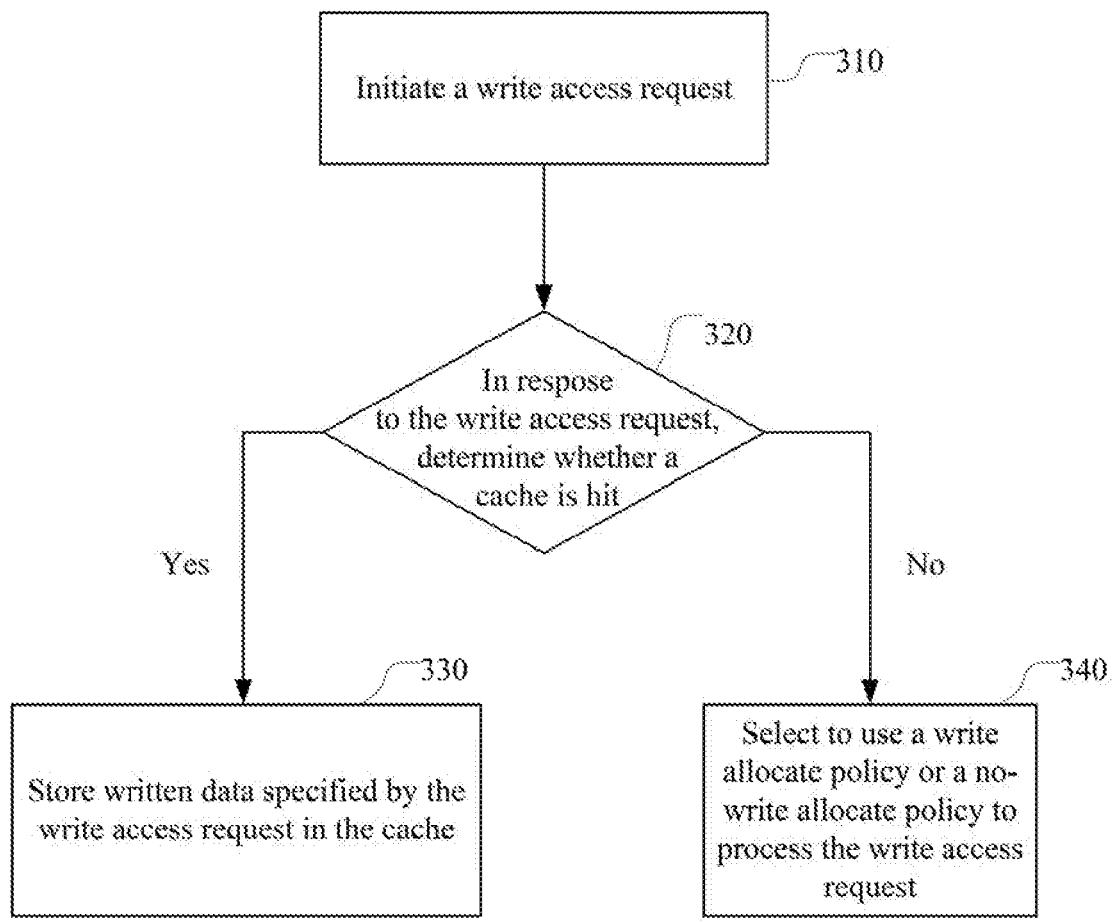
FIG. 3 illustrates a partial schematic flowchart for executing a storage instruction according to an embodiment of the present invention.

FIG. 3 illustrates a partial schematic flowchart for executing a storage instruction according to an embodiment of the present invention. With reference to FIG. 2 and FIG. 3, the following exemplarily describes a process of executing a storage instruction.

In operation 310 shown in FIG. 3, the instruction execution unit 121 initiates a write access request. The write access request includes written data specified by a storage instruction and a physical address to which the storage instruction is mapped.

In operation 310, the instruction execution unit 121 may first initiate an address translation request based on an address operand of the storage instruction, where the address translation request includes a virtual address corresponding to the address operand of the storage instruction; and then the memory management unit 122 responds to the address translation request, and translates, based on a corresponding entry in a page table, the virtual address in the address translation request into a physical address that can be used to access the memory, that is, the physical address to which the storage instruction is mapped.

The write access request may further specify some auxiliary information, where the auxiliary information may include write allocate information used to indicate whether a write allocate policy is valid. The write allocate information may come from global configuration information provided by the register file 126, or may be provided by an attribute flag of an entry that is in the page table and matches the virtual address of the storage instruction, or may come from other configuration information.

In operation 320 shown in FIG. 3, in response to the write access request, the storage control unit 123 compares the physical address to which the storage instruction is mapped, with each cache block address in the cache, to determine whether the access comprises a cache hit or cache mess.

A method for determining whether the access is a the cache hit may include: determining whether a cache block address of the cache 18 matches the physical address to which the write access request is mapped; and if a cache block address of a cache block matches a physical page number of the physical address to which the write access request is mapped, continuing to determine, based on the physical address to which the write access request is mapped, whether a corresponding cache entry (cache entry, where each cache block includes a plurality of cache entries that may be indexed by several bits of the physical address) exists in the matched cache block; where if yes, the cache 18 is hit; or if no cache block or cache entry to which the write access request is mapped exists in the cache 18, it indicates that the write access request does not hit the cache 18.

If the cache is hit, operation 330 is performed: The instruction execution unit 121 updates the corresponding cache entry based on the written data specified by the write access request.

If the cache is not hit, the following operation 340 is performed.

In operation 340 shown in FIG. 3, the storage control unit 123 selects to use a write allocate policy or a no-write allocate policy to process the write access request, to update a corresponding cache block and/or a memory block based on the written data specified by the storage instruction.

It should be noted that, the write allocate policy itself does not affect a function of the computer system, but only affects performance of the computer system and the processor, for example, reduces speeds of executing some storage instructions by the computer system and the processor.

In some embodiments, the storage control unit 123 may be implemented by software and/or hardware. For example, the storage control unit 123 implemented by hardware may be integrated in the processor 12 or the cache 18, or integrated with the processor 12 and/or the cache 18 in a same system-on-a-chip, or coupled to the processor and the cache in another form.

Storage Control Unit

Figure 4:
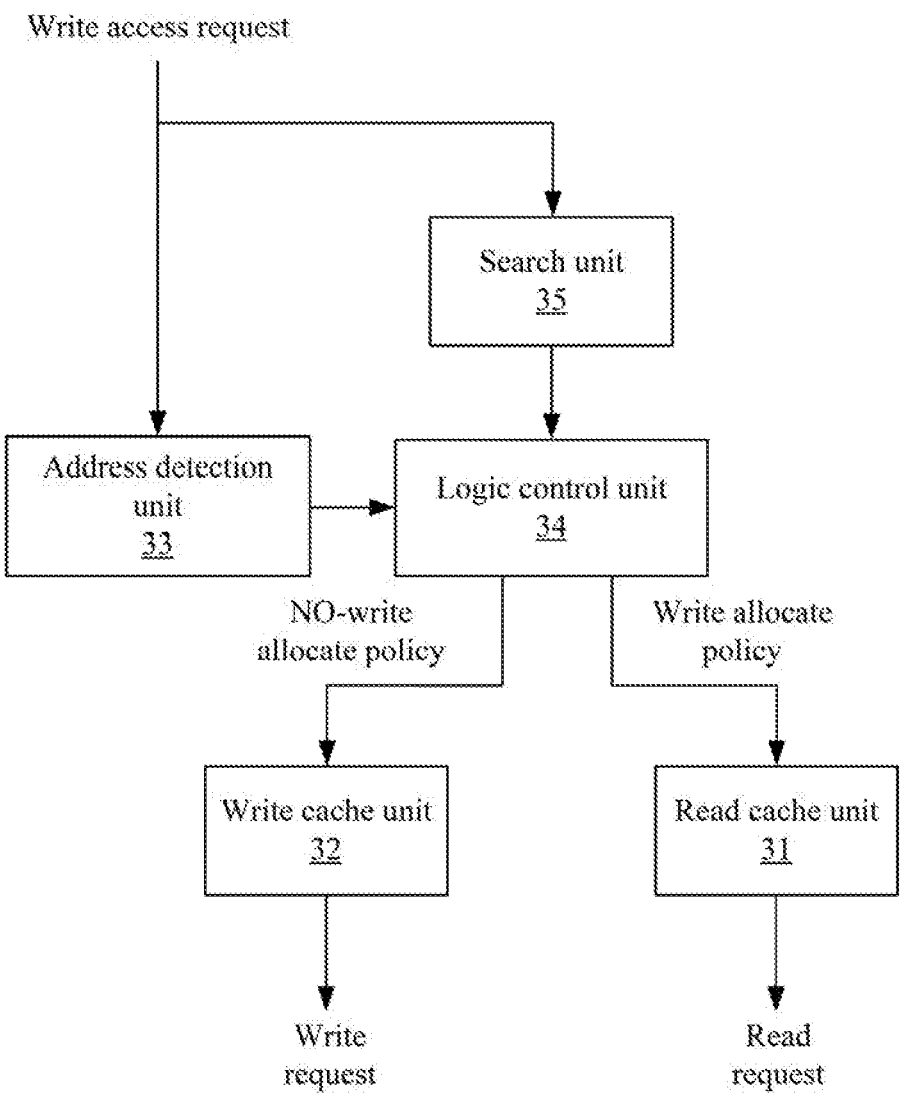
FIG. 4 illustrates a schematic diagram of a storage control unit according to an embodiment of the present invention.

FIG. 4 illustrates a schematic diagram of the storage control unit 123 according to an embodiment of the present invention. The storage control unit may be a storage control apparatus implemented by hardware and/or software. The storage control apparatus may be integrated in the processor 12 or the cache 18, or may be integrated with the processor 12 and/or the cache 18 in a same system-on-a-chip, or may be a packaged chip independent of the processor 12 and the cache 18. Because the storage control unit 123 may be configured to select one of a write allocate policy and a no-write allocate policy, the storage control unit may also be referred to as an allocate mode regulator (AMR).

The storage control unit 123 is configured to: receive a write access request, determine whether any jump of physical addresses to which sequentially arriving write access requests are mapped occurs, and select one of a write allocate policy and a no-write allocate policy based on determined jump result information and a storage control logic, so that when the cache is not hit, the selected write allocate policy or no-write allocate policy is used to process a corresponding write access request to update the memory 14 and/or the cache 18.

The storage control unit 123 may include an address detection unit 33, a logic control unit 34, a search unit 35, a write cache unit 32, and a read cache unit 31. However, this embodiment of this application is not limited thereto.

In a process of performing a memory copy operation, the storage control unit 123 receives a series of write access requests corresponding to a storage instruction stream. The search unit 35 is configured to compare a physical address to which a write access request is mapped, with each cache block address in the cache 18, to determine whether the cache is hit.

If the cache 18 is hit, written data specified by the write access request is directly written to a corresponding cache block. The cache block may be marked as a dirty block. In some subsequent steps, the cache block marked as the dirty block may be unified with a corresponding memory block in the memory 14, and a mark used for indicating the dirty block is removed afterward in accordance with a write-back policy.

If the cache is not hit, the logic control unit 34 selects the write allocate policy or the no-write allocate policy based on determined jump result information provided by the storage control logic and the address detection unit 33.

In the write allocate policy, the logic control unit 34 controls the read cache unit 31 to initiate a read request, so that the memory 14 returns, in response to the read request, a required data block to the read cache unit 31. Then the read cache unit 31 writes the data block to a corresponding cache block address of the cache 18. Then the search unit 35 may perform a search again among cache blocks in the cache. Because a cache block that matches the physical address to which the write access request is mapped exists in the cache, the cache is hit, and the specified written data can be directly stored in the corresponding cache block, to modify data temporarily stored in the cache.

In the no-write allocate policy, the logic control unit 34 controls the write cache unit 32 to initiate a write request to the memory 14. The write cache unit 32 temporarily stores the written data specified by the write access request and updates a corresponding memory block in the memory 14 based on the temporarily stored written data, without writing the corresponding memory block in the memory 14 to the cache or modifying the data stored in the cache.

The address detection unit 33 is configured to detect a physical address to which a write access request is mapped, to determine a jump result of whether any jump of physical addresses to which sequentially arriving write access requests are mapped occurs, and provide the determined jump result information. For example, when physical addresses to which two continuous write access requests are mapped correspond to discontinuous physical pages, the physical addresses to which the two write access requests are mapped are discontinuous. In this case, the determined jump result information indicates that jumps of the physical addresses to which the sequentially arriving write access requests are mapped occur. The determined jump result information may be stored in a corresponding register, and includes, for example: whether a physical address to which a current write access request is mapped and a physical address to which a previously arriving write access request is mapped are continuous; a quantity of continuous jumps of the physical addresses to which the sequentially arriving write access requests are mapped; and whether no continuous jump of the physical addresses to which the sequentially arriving write access requests are mapped occurs. However, the determined jump result information in this embodiment of the present disclosure is not limited thereto.

In some embodiments, when the determined jump result information indicates that no jump of the physical addresses to which the plurality of sequentially arriving write access requests are mapped occurs, the logic control unit 34 may select to use the no-write allocate policy to process the current write access request. In the no-write allocate policy, if the determined jump result information indicates that a quantity of continuous jumps of the physical addresses to which the plurality of sequentially arriving write access requests are mapped is greater than or equal to a preset quantity y, the logic control unit 34 performs restoration from the no-write allocate policy to the write allocate policy. The preset quantity y may be set to a fixed value greater than 1, or may be determined based on a quantity of times that the foregoing memory copy function is invoked in a current memory copy operation, or may be set or dynamically adjusted based on another factor.

In some embodiments, the address detection unit 33 may temporarily store the physical address to which the previously received write access request is mapped (for example, temporarily store by using a corresponding register), and compare, in a bitwise manner, the temporarily stored physical address of the previously received write access request with the physical address to which the currently received write access request is mapped, to determine whether a jump of physical addresses, to which the two sequentially arriving write access requests are mapped, occurs.

In some embodiments, the write access request may include the foregoing write allocate information. When the write allocate information indicates the write allocate policy, the logic control unit 34 may screen write policy information of the write access request when selecting the no-write allocate policy. If the logic control unit 34 selects the write allocate policy, the logic control unit 34 does not screen the write allocate information, and instead uses the write allocate policy to process the write access request. The write allocate information is, for example, a flag stored in a corresponding register.

The storage control logic may be implemented by hardware and/or software, for example, implemented by a component such as a counter, some registers in a register file, and a logic circuit.

Based on the foregoing analysis, the following exemplarily describes a storage control method implemented by a storage control logic.

Embodiment 1

According to one embodiment, a storage control logic is implemented by a state machine. The state machine may include an initial state and a primary screening state, but this application is not limited thereto.

Figure 5A:
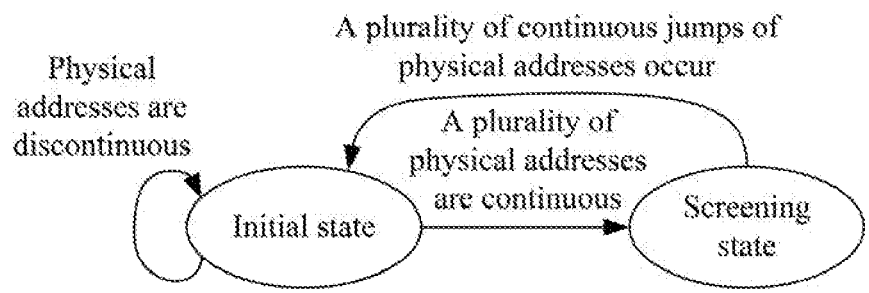
FIG. 5a to FIG. 5c respectively illustrate schematic state transition diagrams of a storage control logic according to an embodiment of the present invention.

FIG. 5a illustrates a schematic state transition diagram of the storage control logic according to this embodiment of the present invention.

Initial state: The storage control logic uses a write allocate policy. In this state, if determined jump result information indicates that no jump of physical addresses to which sequentially arriving i write access requests are mapped occurs, the storage control logic exits the initial state and enters the primary screening state; otherwise, the storage control logic keeps the initial state. The i write access requests herein point to i continuous physical addresses, and the i continuous physical addresses correspond to, for example, several bytes or dozens of bytes of data, where i is a natural number greater than or equal to 1.

Primary screening state: The storage control logic uses a no-write allocate policy. For example, this is implemented by screening write allocate information in a write access request. In this state, if Y1 continuous jumps of physical addresses to which a plurality of sequentially arriving write access requests are mapped occur, the storage control logic returns to the initial state; or if a quantity of continuous jumps of physical addresses to which sequentially arriving write access requests are mapped is less than Y1, or no jump occurs, the storage control logic keeps the primary screening state, to use the no-write allocate policy to process a current write access request. In this embodiment, Y1 is equal to a preset quantity y.

As can be seen, in this embodiment, a condition for transitioning from the initial state to the primary screening state is "no jump of physical addresses to which sequentially arriving i write access requests are mapped occurs", and a condition for transitioning from the primary screening state to the initial state is "Y1 continuous jumps of physical addresses to which sequentially arriving write access requests are mapped occur".

As can be known from the foregoing example, in this embodiment, in an operation such as memory copy that is used to process data of a low access frequency, unnecessary switching between the write allocate policy and the no-write allocate policy that is caused by any jump of physical addresses to which write access requests are mapped is avoided, and performance and efficiency of a processor are improved.

After the memory copy operation is ended, the storage control logic restores the write allocate policy based on a subsequent write access request.

Embodiment 2

According to one embodiment, a storage control logic is implemented by a state machine. The state machine may include an initial state, a primary screening state, and a level 1 caching state, but this application is not limited thereto.

Figure 5B:
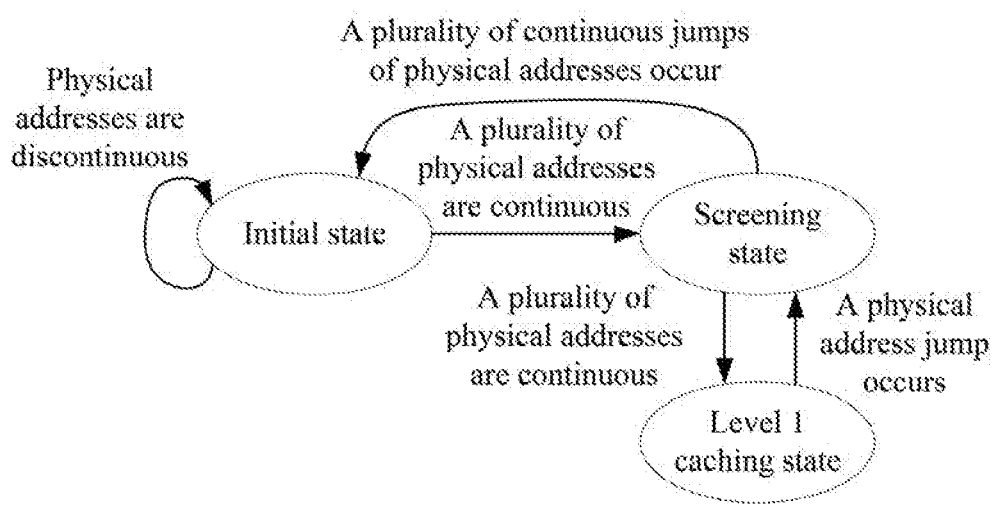

FIG. 5b illustrates a schematic state transition diagram of the storage control logic according to this embodiment of the present invention.

Initial state: The storage control logic uses a write allocate policy. In this state, if determined jump result information indicates that no jump of physical addresses to which sequentially arriving i write access requests are mapped occurs, the storage control logic exits the initial state and enters the primary screening state; otherwise, the storage control logic keeps the initial state. A definition of i herein is the same as that in Embodiment 1, and is not described again herein.

Primary screening state: The storage control logic uses a no-write allocate policy. For example, this is implemented by screening write allocate information in a write access request. In this state, if determined jump result information indicates that Y2 continuous jumps of physical addresses to which sequentially arriving write access requests are mapped occur, the storage control logic exits the primary screening state and returns to the initial state; or if continuously arriving write access requests are mapped to continuous physical addresses, the storage control logic exits the primary screening state and enters the level 1 caching state. In other cases, no state transition occurs. Y2 may be set to a fixed value greater than 1, or may be determined based on a quantity of times that the foregoing memory copy function is invoked in a current memory copy operation, or may be set or dynamically adjusted based on another factor.

Level 1 caching state: The storage control logic uses the no-write allocate policy. In this state, if determined jump result information indicates that a plurality of continuously arriving write access requests are sequentially mapped to continuous physical addresses, the storage control logic keeps the level 1 caching state; or if determined jump result information indicates that any jump of physical addresses to which sequentially arriving write access requests are mapped occurs, the storage control logic exits the 1 caching state and returns to the primary screening state.

In this embodiment, the storage control logic in the initial state is mainly configured to process some operations other than the memory copy operation, so that written data specified by write access requests initiated by the operations can be written to a cache by using the write allocate policy, to facilitate access. Both the primary screening state and the level 1 caching state are states using the no-write allocate policy, but screening strength of the primary screening state is different from that of the level 1 caching state. The screening strength herein indicates a quantity, that is, a preset quantity y, of continuous jumps of physical addresses to which sequentially arriving write access requests are mapped, required for returning from a current state to the initial state.

A condition for transitioning from the primary screening state to the initial state is "Y2 continuous jumps of physical addresses to which sequentially arriving write access requests are mapped occur". Therefore, the screening strength of the primary screening state is equal to Y2, that is, in the primary screening state, the preset quantity y is equal to Y2.

To return from the level 1 caching state to the initial state, the storage control logic needs to go through the primary screening state. In addition, after returning from the level 1 caching state to the primary screening state, if write access requests are mapped to a plurality of continuous physical addresses again, the storage control logic may transition from the primary screening state to the level 1 caching state again. Therefore, the screening strength of the level 1 caching state is greater than Y2 (that is, in the level 1 caching state, the preset quantity y is greater than Y2). Therefore, unnecessary switching between the write allocate policy and the no-write allocate policy that is caused by a single jump or a few jumps of physical addresses can be avoided.

Based on this embodiment, preferably, a condition for transitioning from the initial state to the primary screening state is "no jump of physical addresses to which sequentially arriving i write access requests are mapped occurs", a condition for transitioning from the primary screening state to the level 1 caching state is "no jump of physical addresses to which a plurality of sequentially arriving write access requests are mapped occurs", a condition for transitioning from the level 1 caching state to the primary screening state is "physical addresses to which a currently received write access request and a previously arriving write access request are mapped are discontinuous", and a condition for transitioning from the primary screening state to the initial state is "Y2 continuous jumps of physical addresses to which a plurality of sequentially arriving write access requests are mapped occur". However, this embodiment is not limited thereto. For example, alternatively, the condition for transitioning from the primary screening state to the level 1 caching state may be "a currently received write access request and a previously arriving write access request are mapped to continuous physical addresses".

As can be known from the foregoing example, in this embodiment, in an operation such as memory copy that is used to process data of a low access frequency, unnecessary switching between the write allocate policy and the no-write allocate policy that is caused by any jump of physical addresses to which write access requests are mapped is avoided, and performance and efficiency of a processor are improved.

After the memory copy operation is ended, the storage control logic gradually restores the write allocate policy based on a subsequent write access request.

Embodiment 3

According to one embodiment, a storage control logic is implemented by a state machine. The state machine may include an initial state, a primary screening state, and a level 1 caching state to a level K caching state, but this application is not limited thereto, where K is a natural number greater than or equal to 2. Different states in the state machine may correspond to different state numbers. The state numbers are, for example, stored in registers.

Figure 5C:
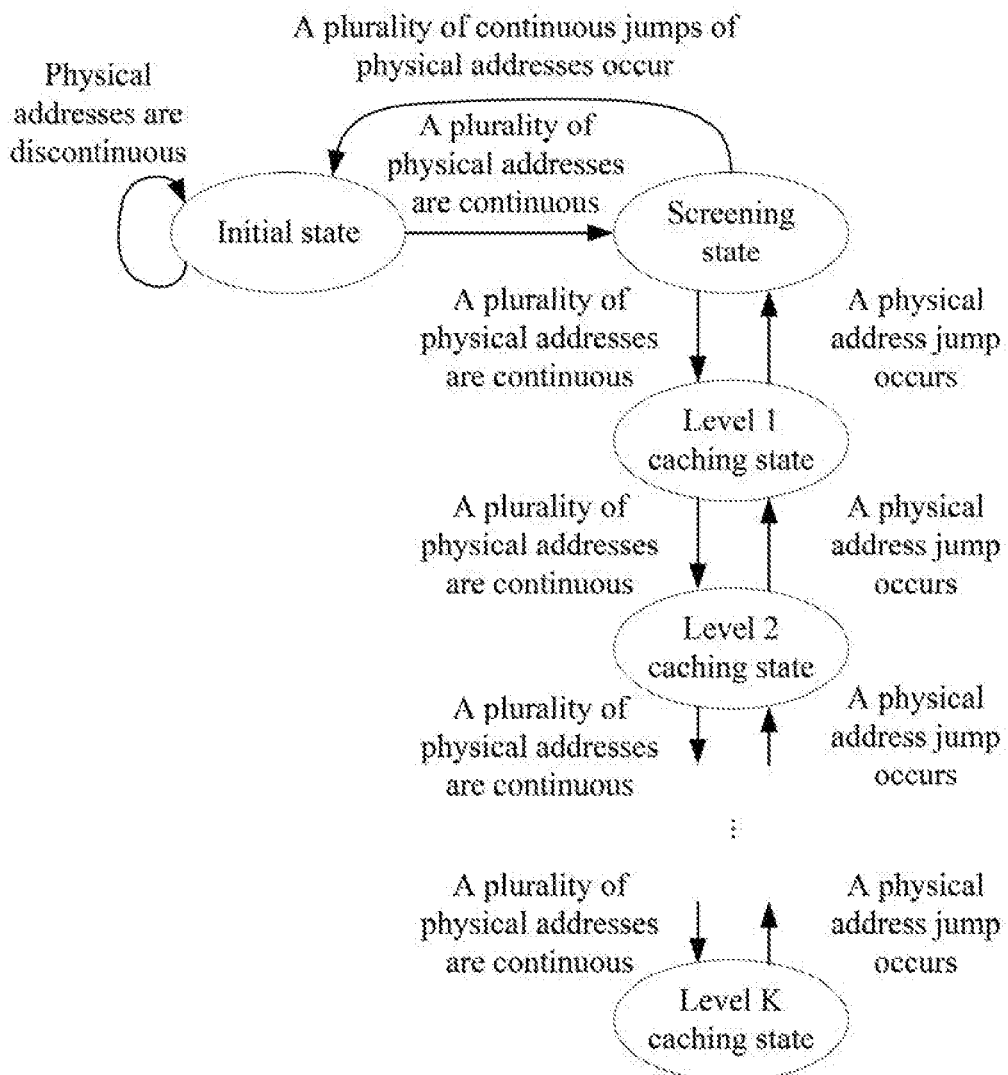

FIG. 5c illustrates a schematic state transition diagram of the storage control logic according to this embodiment of the present invention.

Initial state: The storage control logic uses a write allocate policy. In this state, if determined jump result information indicates that no jump of physical addresses to which sequentially arriving i write access requests are mapped occurs, the logic control logic exits the initial state and enters the primary screening state; otherwise, the storage control logic keeps the initial state. A definition of i herein is the same as that in Embodiment 1, and is not described again herein.

Primary screening state: The storage control logic uses a no-write allocate policy. For example, this is implemented by screening write allocate information in a write access request. In this state, if determined jump result information indicates that Y3 continuous jumps of physical addresses to which sequentially arriving write access requests are mapped occur, the storage control logic exits the primary screening state and returns to the initial state; or if continuously arriving write access requests are mapped to continuous physical addresses, the storage control logic exits the primary screening state and enters the level 1 caching state. In other cases, no state transition occurs. Y3 may be set to a fixed value greater than 1, or may be determined based on a quantity of times that the foregoing memory copy function is invoked in a current memory copy operation, or may be set or dynamically adjusted based on another factor.

Level 1 caching state to level K caching state: The storage control logic uses the no-write allocate policy.

In the 1 caching state, if determined jump result information indicates that any jump of physical addresses to which sequentially arriving write access requests are mapped occurs, the storage control logic returns to the primary screening state. In the level 1 caching state to the level K−1 caching state, if determined jump result information indicates that no jump of physical addresses to which a plurality of sequentially arriving write access requests are mapped occurs, the storage control logic transitions to a lower-level caching state. In the level 2 caching state to the level K caching state, if determined jump result information indicates that any jump of physical addresses to which sequentially arriving write access requests are mapped occurs, the storage control logic transitions to an upper-level caching state.

Similar to the foregoing Embodiment 2, in this embodiment, all of the primary screening state and the level 1 caching state to the level K caching state are states using the no-write allocate policy. However, screening strength of the primary screening state and the level 1 caching state to the level K caching state increases sequentially. A value of K may be determined based on a preset quantity y.

For example, to return from the level 1 caching state to the initial state, the storage control logic needs to go through the primary screening state. The storage control logic can restore the write allocate policy only when a quantity of continuous jumps of physical addresses to which sequentially arriving write access requests are mapped reaches Y3+1. For the level 2 caching state, to return from the level 2 caching state to the initial state, the storage control logic needs to go through the primary screening state and the level 1 screening state. In addition, after returning from the level 2 caching state to the level 1 caching state, if write access requests are mapped to a plurality of continuous physical addresses again, the storage control logic may transition from the level 1 caching state to the level 2 caching state again.

Therefore, screening strength of a caching state on each level increases sequentially (that is, the preset quantity y corresponding to the caching state on each level increases sequentially). In addition, in all such states, unnecessary switching between the write allocate policy and the no-write allocate policy that is caused by a single jump or a few jumps of physical addresses can be avoided, and unnecessary switching between the write allocate policy and the no-write allocate policy that is caused by a single jump or a few jumps of discontinuous physical addresses can also be avoided.

Based on this embodiment, preferably, a condition for transitioning from the initial state to the primary screening state is "no jump of physical addresses to which sequentially arriving i write access requests are mapped occurs", a condition for transitioning from the primary screening state to the level 1 caching state and transitioning from the caching state on each level to the lower-level caching state is "no jump of physical addresses to which a plurality of sequentially arriving write access requests are mapped occurs", a condition for returning from the level 1 caching state to the primary screening state is "a jump of physical addresses to which two sequentially arriving write access requests are mapped occurs", a condition for returning from the caching state on each level to the upper-level caching state is "a jump of physical addresses to which two sequentially arriving write access requests are mapped occurs", and a condition for transitioning from the primary screening state to the initial state is "Y3 continuous jumps of physical addresses to which a plurality of sequentially arriving write access requests are mapped occur". However, this embodiment is not limited thereto. For example, alternatively, the condition for transitioning from the primary screening state to the level 1 caching state or transitioning from the caching state on each level to the lower-level caching state may be "a currently received write access request and a previous write access request are mapped to continuous physical addresses".

After the memory copy operation is ended, the storage control logic restores the write allocate policy based on a subsequent write access request.

Similarly to the foregoing Embodiment 1 and Embodiment 2, in this embodiment, in an operation such as memory copy that is used to process data of a low access frequency, unnecessary switching between the write allocate policy and the no-write allocate policy is reduced, and performance and efficiency of a processor are improved.

Embodiment 4

According to another embodiment, a storage control unit 123 may further include a register configured to store a cache depth value, and the storage control logic may implement a corresponding storage control method based on the cache depth value.

Figure 6:
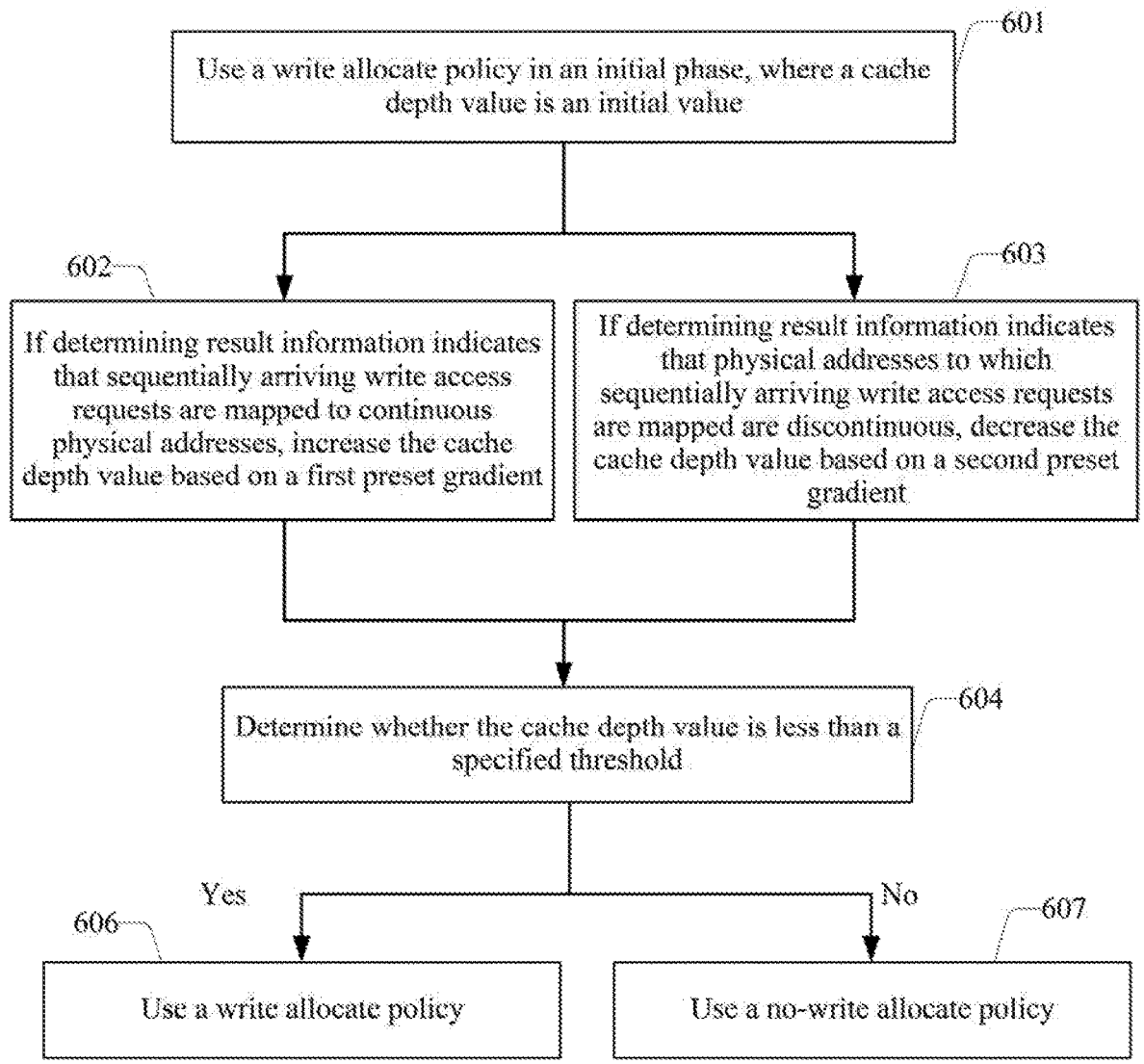
FIG. 6 illustrates a schematic flowchart of a storage control method according to an embodiment of the present invention.

FIG. 6 illustrates a schematic flowchart of a storage control method according to this embodiment of the present invention.

As shown in FIG. 6, in operation 601, a write allocate policy is used in an initial phase, and a cache depth value is an initial value.

In operation 602, if determined jump result information indicates that no jump of physical addresses to which at least two sequentially arriving write access requests are mapped occurs, the cache depth value is increased based on a first preset gradient. For example, an operation of adding 1 is performed on the cache depth value.

In operation 603, if determined jump result information indicates that physical addresses to which at least two sequentially arriving write access requests are mapped are discontinuous, the cache depth value is decreased based on a second preset gradient. For example, an operation of subtracting 1 is performed on the cache depth value. The second preset gradient is, for example, equal to the first preset gradient.

In operation 604, whether the cache depth value is less than a specified threshold is determined, and if yes, operation 605 is performed to use a write allocate policy, or if no, operation 606 is performed to use a no-write allocate policy.

In some embodiments, the specified threshold is greater than or equal to a sum of the initial value and the first preset gradient (or the second gradient). Therefore, when a single jump or a few jumps of physical addresses to which sequentially arriving write access requests are mapped occur, restoration from the no-write allocate policy to the write allocate policy is not performed.

In this embodiment, in an operation such as memory copy that is used to process data of a low access frequency, unnecessary switching between the write allocate policy and the no-write allocate policy that is caused by any jump of physical addresses to which write access requests are mapped can also be avoided, and performance and efficiency of a processor are improved.

Up to now, the storage control method, storage control apparatus, and related processing apparatus and computer system for selecting one of the write allocate policy and the no-write allocate policy based on whether any jump of physical addresses to which sequentially arriving write access requests are mapped occurs have been described by using examples.

In a conventional solution, if it is detected that continuous write access requests are mapped to continuous physical addresses (that is, no jump occurs), a no-write allocate policy is used to respond to the write access requests. If it is detected that any jump of physical addresses to which continuous write access requests are mapped occurs, a processor directly quits a no-write allocate operation, and switches to a write allocate operation.

However, for continuous write access requests, some data that may not be repeatedly accessed may not necessarily correspond to continuous physical addresses. For example, in a memory copy operation process or the like, the processor may need to jump to other addresses at regular intervals to perform memory move operations or the like; in some processes, data blocks that need to be continuously accessed may have continuous virtual addresses, but the continuous virtual addresses may be mapped to discontinuous physical addresses. In the conventional solution, a write allocate operation may be used in such cases of physical address jumps. Therefore, efficiency of the processor is reduced, and performance of the processor is reduced.

In comparison with the conventional solution, the storage control method, storage control apparatus, processing apparatus, and computer system provided by the embodiments of the present disclosure can detect whether a plurality of jumps of the physical addresses to which the sequentially arriving write access requests are mapped occur, and if a quantity of continuous jumps of the physical addresses to which the plurality of sequentially arriving write access requests are mapped is less than the preset quantity, keep using the no-write allocate policy, instead of storing the written data specified by the write access requests in the cache and/or the memory, to avoid, as much as possible, completing storage of the written data by selecting the write allocate policy during processing of information of a low access probability, avoid storing written data of a low access probability in the cache, improve performance and efficiency of the computer system, and enhance robustness and stability of the processor and the computer system.

This application further discloses a computer readable storage medium including computer executable instructions stored thereon. When being executed by the processor, the computer executable instruction causes the processor to execute the methods of the embodiments described herein.

In addition, this application further discloses a system. The system includes an apparatus configured to implement the method according to each embodiment in this specification.

This application further discloses a processing apparatus. The processing apparatus includes the foregoing processor or processor core, or a system-on-a-chip that integrates the foregoing processor or processor core.

It should be appreciated that the foregoing descriptions are merely exemplary embodiments of the present invention and are not intended to limit the present invention. For those skilled in the art, there are many variations for the embodiments of this specification. Any modification, equivalent replacement, and improvement made without departing from the spirit and principle of the present invention shall fall within the protection scope of the present invention.

For example, in some embodiments, the storage control unit may include an enable register. Enabling and disabling of the storage control unit may be set by configuring at least one numeric value in the enable register.

It should be understood that the embodiments in this specification are all described in a progressive manner. For same or similar parts in the embodiments, mutual reference may be made, and each embodiment focuses on a difference from other embodiments. In particular, the method embodiment is essentially similar to the method described in the apparatus embodiment and system embodiment, and therefore is described briefly. For related parts, reference may be made to partial descriptions in the other embodiments.

It should be understood that specific embodiments in this specification are described above. Other embodiments fall within the scope of the claims. In some cases, actions or steps described in the claims may be performed in a sequence different from those in the embodiments, and expected results can still be achieved. In addition, illustrated specific sequences or continuous sequences are not necessarily required for the processes described in the drawings to achieve the expected results. In some implementations, multi-task processing and parallel processing are also allowed or may be advantageous.

It should be understood that a component described in a singular form herein or only one component shown in the accompanying drawings does not mean that a quantity of such components is limited to one. In addition, separate modules or components described or shown herein may be combined into one module or component, and one module or component described or shown herein may be split into a plurality of modules or components.

It should be further understood that the terms and expressions used herein are used for description only, and that one or more embodiments of this specification should not be limited to these terms and expressions. Use of these terms and expressions does not imply exclusion of any equivalent features indicated or described (or partial features thereof), and it should be recognized that any possible modifications should also fall within the scope of the claims. Other modifications, changes, and replacements may also exist. Correspondingly, the claims shall be considered to cover all these equivalents.

What is claimed is:

1. A storage control method, comprising:
    detecting whether any jump of physical addresses to which a plurality of sequentially arriving write access requests are mapped occurs; and
    selecting one of a write allocate policy and a no-write allocate policy to process the plurality of sequentially arriving write access requests, wherein the storage control method further comprises:
        selecting initially the write allocate policy if a cache is not hit and when a quantity of continuous jumps of the physical addresses to which the plurality of sequentially arriving write access requests are mapped is greater than or equal to a preset quantity, and
        switching to the no-write allocate policy to process the plurality of sequentially arriving write access requests if the cache is not hit and no jump of the physical addresses to which the plurality of sequentially arriving write access requests are mapped occurs, wherein, in the no-write allocate policy, if the quantity of continuous jumps of the physical addresses to which the plurality of sequentially arriving write access requests are mapped is less than the preset quantity, continuing using the no-write allocate policy instead of selecting a write allocate policy, and
    wherein the preset quantity is greater than 1.

2. The storage control method according to claim 1, wherein the preset quantity is set to a fixed value, or is determined based on a quantity of times that a memory access function is invoked, and wherein
    the memory access function is implemented by at least one of the plurality of sequentially arriving write access requests.

3. The storage control method according to claim 1, wherein the write access request comprises:
    a physical address to which a storage instruction is mapped; and
    written data specified by the storage instruction, wherein in the no-write allocate policy, the written data is written to a memory and is not written to the cache.

4. The storage control method according to claim 3, further comprising:
    in the no-write allocate policy, if the quantity of continuous jumps of the physical addresses to which the plurality of sequentially arriving write access requests are mapped is greater than or equal to the preset quantity, using the write allocate policy, wherein in the write allocate policy, the written data is written to the cache.

5. The storage control method according to claim 4, wherein the storage control method further comprises:
in an initial state, selecting to use the write allocate policy, and if no jump of the physical addresses to which the plurality of sequentially arriving write access requests are mapped occurs, exiting the initial state, and entering a primary screening state; and
in the primary screening state, using the no-write allocate policy, and if the quantity of continuous jumps of the physical addresses to which the plurality of sequentially arriving write access requests are mapped is equal to the preset quantity, returning to the initial state.

6. The storage control method according to claim 5, wherein the storage control method further comprises:
in the primary screening state, if no jump of the physical addresses to which the plurality of sequentially arriving write access requests are mapped occurs, entering a level 1 caching state; and
in the level 1 caching state, if any jump of the physical addresses to which the plurality of sequentially arriving write access requests are mapped occurs, returning to the primary screening state.

7. The storage control method according to claim 6, wherein the storage control method further comprises:
in the level 1 caching state to a level K−1 caching state, if no jump of the physical addresses to which the plurality of sequentially arriving write access requests are mapped occurs, transitioning to a lower-level caching state; and
in a level 2 caching state to a level K caching state, if any jump of the physical addresses to which the plurality of sequentially arriving write access requests are mapped occurs, transitioning to an upper-level caching state, wherein
K is a natural number greater than or equal to 2.

8. The storage control method according to claim 4, wherein the storage control method further comprises:
in an initial phase, using the write allocate policy, and resetting a cache depth value to an initial value;
if no jump of the physical addresses to which the plurality of sequentially arriving write access requests are mapped occurs, increasing the cache depth value based on a first preset gradient;
if any jump of the physical addresses to which the plurality of sequentially arriving write access requests are mapped occurs, decreasing the cache depth value based on a second preset gradient; and
when the cache depth value is less than a specified threshold, selecting to use the write allocate policy, or when the cache depth value is greater than or equal to the specified threshold, selecting to use the no-write allocate policy.

9. The storage control method according to claim 8, wherein the specified threshold is greater than or equal to a sum of the initial value and the first preset gradient.

10. The storage control method according to claim 4, wherein the write access request further comprises write policy information, and wherein the write policy information indicates one of the write allocate policy and the no-write allocate policy; and
by screening the write policy information of the write access request, use the no-write allocate policy; or
use the write allocate policy based on the write policy information of the write access request.

11. The storage control method according to claim 10, further comprising:
obtaining an entry that matches a virtual address specified by the storage instruction;
translating, based on an identifier of the entry and the written data, the virtual address specified by the storage instruction into the physical address to which the storage instruction is mapped; and
providing the write policy information based on an attribute flag of the entry.

12. The storage control method according to claim 10, wherein the write policy information is provided by a global register.

13. The storage control method according to claim 4, wherein the storage control method further comprises:
initiating a read request to the memory in the write allocate policy, and storing a data block returned by the memory in the cache, so that the data block is modified based on the written data.

14. The storage control method according to claim 4, wherein the storage control method further comprises:
initiating a read request to the memory in the no-write allocate policy, so that a corresponding data block in the memory is modified based on the written data.

15. A storage control apparatus, comprising:
an address detection unit implemented in a processor, and adapted to detect whether any jump of physical addresses to which a plurality of sequentially arriving write access requests are mapped occurs; and
a logic control unit implemented in the processor, coupled to the address detection unit, and adapted to select one of a write allocate policy and a no-write allocate policy to process the plurality of sequentially arriving write access requests, wherein the logic control unit is adapted to:
select initially the write allocate policy if a cache is not hit and when a quantity of continuous jumps of the physical addresses to which the plurality of sequentially arriving write access requests are mapped is greater than or equal to a preset quantity; and
switch to the no-write allocate policy to process the plurality of sequentially arriving write access requests if the cache is not hit and no jump of the physical addresses to which the plurality of sequentially arriving write access requests are mapped occurs, wherein, in the no-write allocate policy, if the quantity of continuous jumps of the physical addresses to which the plurality of sequentially arriving write access requests are mapped is less than the preset quantity, the logic control unit keeps using the no-write allocate policy instead of selecting the write allocate policy, and
wherein the preset quantity is greater than 1.

16. The storage control apparatus according to claim 15, wherein the write access request comprises:
a physical address to which a storage instruction is mapped; and
written data specified by the storage instruction, wherein in the no-write allocate policy, the written data is written to a memory and is not written to the cache.

17. The storage control apparatus according to claim 16, wherein the logic control unit implemented in the processor is further adapted to:
in the no-write allocate policy, if the quantity of continuous jumps of the physical addresses to which the plurality of sequentially arriving write access requests are mapped is greater than or equal to the preset quantity, select the write allocate policy, wherein in the write allocate policy, the written data is written to the cache.

18. The storage control apparatus according to claim 17, wherein the logic control unit implemented in the processor is further adapted to:
in an initial state, select the write allocate policy, and if no jump of the physical addresses to which the plurality of sequentially arriving write access requests are mapped occurs, exit the initial state, and enter a primary screening state; and
in the primary screening state, select the no-write allocate policy, and if the quantity of continuous jumps of the physical addresses to which the plurality of sequentially arriving write access requests are mapped is equal to the preset quantity, return to the initial state.

19. The storage control apparatus according to claim 18, wherein the logic control unit implemented in the processor is further adapted to:
in the primary screening state, if no jump of the physical addresses to which the plurality of sequentially arriving write access requests are mapped occurs, enter a level 1 caching state; and
in the level 1 caching state, if any jump of the physical addresses to which the plurality of sequentially arriving write access requests are mapped occurs, return to the primary screening state.

20. The storage control apparatus according to claim 19, wherein the logic control unit implemented in the processor is further adapted to:
in the level 1 caching state to a level K−1 caching state, if no jump of the physical addresses to which the plurality of sequentially arriving write access requests are mapped occurs, transition to a lower-level caching state; and
in a level 2 caching state to a level K caching state, if any jump of the physical addresses to which the plurality of sequentially arriving write access requests are mapped occurs, transition to an upper-level caching state, wherein
K is a natural number greater than or equal to 2.

21. The storage control apparatus according to claim 17, further comprising a register configured to store a cache depth value, wherein the logic control unit implemented in the processor is further adapted to:
in an initial phase, select the write allocate policy, and reset the cache depth value to an initial value;
if the plurality of sequentially arriving write access requests are sequentially mapped to continuous physical addresses, increase the cache depth value based on a first preset gradient;
if any jump of the physical addresses to which the plurality of sequentially arriving write access requests are mapped occurs, decrease the cache depth value based on a second preset gradient; and
when the cache depth value is less than a specified threshold, select the write allocate policy, or when the cache depth value is greater than or equal to the specified threshold, select the no-write allocate policy.

22. The storage control apparatus according to claim 21, wherein the specified threshold is greater than or equal to a sum of the initial value and the first preset gradient.

23. The storage control apparatus according to claim 17, wherein the write access request further comprises write policy information, wherein the write policy information indicates one of the write allocate policy and the no-write allocate policy; and wherein
the logic control unit implemented in the processor is configured to perform the following:
screening the write policy information of the write access request, to select the no-write allocate policy; or
using the write allocate policy based on the write policy information of the write access request.

24. A processing apparatus, wherein the processing apparatus is a processor, a processor core, or a system-on-a-chip, and comprises:
the storage control apparatus according to claim 23;
an instruction execution unit implemented in a cache, and adapted to provide the write access request on the storage instruction; and
a hardware register, adapted to provide the write policy information as a global register.

25. The processing apparatus according to claim 24, further comprising:
a memory management unit implemented in the cache, coupled to the hardware register, and adapted to provide an entry that matches a virtual address specified by the storage instruction, to translate the virtual address based on the entry into the physical address to which the storage instruction is mapped and provide the write policy information to the instruction execution unit.

26. The storage control apparatus according to claim 17, further comprising:
a read cache unit implemented in the cache, and adapted to initiate a read request to the memory in the write allocate policy, and store a data block returned by the memory in the cache, so that the data block is modified based on the written data.

27. The storage control apparatus according to claim 17, further comprising:
a write cache unit implemented in the cache, and adapted to initiate a write request to the memory in the no-write allocate policy, so that a corresponding data block in the memory is modified based on the written data.

28. The storage control apparatus according to claim 15, wherein the preset quantity is set to a fixed value, or is determined based on a quantity of times that a memory access function is invoked, and wherein
the memory access function is implemented by at least one of the plurality of sequentially arriving write access requests.

29. A processing apparatus, wherein the processing apparatus is a processor, a processor core, or a system-on-a-chip, and comprises the storage control apparatus according to claim 15.

30. A computer system, comprising:
the processing apparatus according to claim 29;
a cache, coupled to the storage control apparatus; and
a memory, coupled to the storage control apparatus.

31. The computer system according to claim 30, wherein the computer system is implemented by a system-on-a-chip.

* * * * *